(12) United States Patent
Schreter

(10) Patent No.: US 9,262,458 B2
(45) Date of Patent: Feb. 16, 2016

(54) METHOD AND SYSTEM FOR DYNAMICALLY PARTITIONING VERY LARGE DATABASE INDICES ON WRITE-ONCE TABLES

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 14/281,549

(22) Filed: May 19, 2014

(65) Prior Publication Data

US 2014/0258252 A1    Sep. 11, 2014

Related U.S. Application Data

(63) Continuation of application No. 12/338,074, filed on Dec. 18, 2008, now Pat. No. 8,732,139.

(51) Int. Cl.
*G06F 17/30*  (2006.01)

(52) U.S. Cl.
CPC .... *G06F 17/30336* (2013.01); *G06F 17/30327* (2013.01); *G06F 17/30551* (2013.01)

(58) Field of Classification Search
None
See application file for complete search history.

(56) References Cited

U.S. PATENT DOCUMENTS

| | | | |
|---|---|---|---|
| 5,701,467 A | 12/1997 | Freeston | |
| 5,734,720 A | 3/1998 | Salganicoff | |
| 6,003,036 A | 12/1999 | Martin | |
| 6,092,072 A | 7/2000 | Guha et al. | |
| 6,192,377 B1 | 2/2001 | Ganesh et al. | |
| 6,920,460 B1 | 7/2005 | Srinivasan et al. | |
| 7,047,250 B1 | 5/2006 | Agarwal et al. | |
| 7,085,771 B2 | 8/2006 | Chung et al. | |
| 7,987,164 B2* | 7/2011 | Hu et al. | 707/696 |
| 8,732,139 B2* | 5/2014 | Schreter | 707/696 |
| 2004/0010497 A1 | 1/2004 | Bradley et al. | |
| 2006/0212495 A1 | 9/2006 | Tokunaga et al. | |
| 2007/0271286 A1 | 11/2007 | Purang et al. | |
| 2008/0270461 A1 | 10/2008 | Gordon et al. | |
| 2008/0306978 A1 | 12/2008 | Hoernkvist | |
| 2009/0089334 A1* | 4/2009 | Mohamed et al. | 707/200 |

(Continued)

FOREIGN PATENT DOCUMENTS

| | | |
|---|---|---|
| WO | WO-0124033 A2 | 4/2001 |
| WO | WO-2008043082 A2 | 4/2008 |

OTHER PUBLICATIONS

"U.S. Appl. No. 12/338,074, Response filed Nov. 21, 2011 to Non Final Office Action mailed Aug. 1, 2011", 12 pgs.

(Continued)

*Primary Examiner* — Debbie Le
(74) *Attorney, Agent, or Firm* — Schwegman Lundberg & Woessner, P.A.

(57) ABSTRACT

Methods and systems for partitioning and dynamically merging a database index are described. A database index includes a single first-level index partition stored in a data cache. As the first-level index partition in the data cache reaches a predetermined size, it is copied to secondary storage and a new index partition is generated in the data cache. When the number of index partitions in secondary storage reaches some predetermined number, the index partitions are merged to create a single index partition of a higher level in a hierarchy of index partitions having an exponentially increasing size with each increase in level within the hierarchy.

15 Claims, 7 Drawing Sheets

(56) References Cited

U.S. PATENT DOCUMENTS

2009/0228528 A1* 9/2009 Ercegovac et al. ............ 707/203
2010/0161569 A1 6/2010 Schreter

OTHER PUBLICATIONS

"U.S. Appl. No. 12/338,074, Final Office Action mailed Feb. 3, 2012", 19 pgs.

"U.S. Appl. No. 12/338,074, Notice of Allowance mailed Jan. 9, 2014", 11 pgs.

"U.S. Appl. No. 12/338,074, Response filed Jun. 4, 2012 to Final Office Action mailed Feb. 3, 2012", 12 pgs.

"U.S. Appl. No. 12/388,074, Non Final Office Action mailed Aug. 1, 2011", 22 pgs.

"European Application Serial No. 09013421.4, European Search Report mailed Jul. 26, 2011", 7 pgs.

* cited by examiner

METHOD AND SYSTEM FOR DYNAMICALLY PARTITIONING VERY LARGE DATABASE INDICES ON WRITE-ONCE TABLES

CROSS-REFERENCE TO RELATED APPLICATIONS

This application is a continuation of prior application Ser. No. 12/338,074, filed on Dec. 18, 2008, which is incorporated by reference herein in its entirety.

TECHNICAL FIELD

The present disclosure generally relates to relational database management systems. Some example embodiments relate more specifically to methods and systems for dynamically partitioning very large database indices used with write-once database tables.

BACKGROUND

Relational database management systems store data in relational databases referred to generally as tables. A table is a collection of records (e.g., rows) with defined structure (e.g., columns). Reading from a table the particular records that match some selection criteria typically requires that all records in the table be read and compared against the selection criteria to identify and select the rows satisfying the selection criteria. In order to speed up the selection of data, relational database management systems typically provide a mechanism for indexing the data with one or more database indices. Database indices map a value to a single record or set of records. Typically, an index payload contains a reference or set of references (e.g., a record number or page number and offset). The indices are typically much smaller than the table itself and therefore allow for faster identification and selection of records that satisfy given selection criteria. Searching a database table with an appropriate index is nearly equivalent, in terms of processing time, to reading a subset of records from the table.

Database indices are often implemented with a data structure referred to as a B-tree. A B-tree is a tree data structure that keeps data sorted and allows simple operations such as searches, insertions, and deletions to be realized in logarithmic amortized time. When using a B-tree to represent a database index, each node of the B-tree is a uniformly-sized index page that stores a group of index items. To limit the number of secondary storage (e.g., disk or flash memory drive) access operations required for each single page access, relational database management systems employ a data cache of a fixed-size, usually managed with a least recently used (LRU) algorithm. The data cache is then used to cache index pages in memory, as opposed to secondary storage, resulting in faster more efficient operations.

However, problems arise when the size of the index exceeds the size of the data cache. For instance, when the index fits into the fixed-size data cache in memory, operations on the index execute quickly (on the order of magnitude 10-100 microseconds on current hardware). However, when more and more data are added to the index and the index itself exceeds the fixed-size of the data cache, in all but a few very special cases, the performance of an insertion operation starts degrading very quickly since access to the secondary storage is orders of magnitude slower than memory access. In extreme cases such as when random or pseudo-random keys are utilized, most accesses to the index pages will require loading pages from, and writing pages to, the underlying secondary storage (on the order of magnitude 1-10 milliseconds per page on current hardware). When using a B-tree, accessing an index page (e.g., B-tree node) requires following a path in the tree from the index root page to an index leaf page, which is typically somewhere in the range of three to six pages. For example, as illustrated in the example B-tree 10 of FIG. 1, accessing the index leaf page 12 storing the value "28" requires following a path from the index root page 14 to an internal (non-leaf) page 16, and ultimately to the index leaf page 12. Thus, the performance degradation reaches at least two orders of magnitude.

In certain applications that utilize databases, high volumes of data may be generated and stored in a database without the need for modifying the data once it is stored. For example, some radio frequency identification (RFID) readers or scanners generate near constant streams of data, which represent events that need to be stored and indexed in real time. This RFID-based event data will typically not need to be modified, and in many cases will not be read. However, for the sake of accountability, the data must be available and in certain unusual circumstances the data will be read. In some large RFID-based systems, there may be several thousands of events being processed and stored per second. In a simplified approach, each event can be stored as a record in a database. Consequently, with large RFID-based systems, a database can grow in size rapidly.

With an extremely large database table, for performance reasons, processing a search query without an index by reading each record in the table is not a viable option. However, with extremely large database tables, a traditional database index gives rise to certain performance issues as well. For instance, utilizing a simple database index results in a very high input/output (I/O) load for processing potentially tens of thousands of pages per second. Furthermore, the amount of time required to perform an insert operation on the B-tree index becomes excessively long. This is due to the requirement that the index tree sub-paths be locked when modifying and rebalancing the nodes of the B-tree. Each lock on a tree sub-path must be held for a comparatively long time due to waiting on the completion of I/O processing, which in turn slows down parallel or concurrent writing transactions, and also the RFID readers or scanners. Consequently, even with an I/O system that is theoretically capable of sustaining the heavy I/O load, due to locking issues, performance may still suffer.

One common approach to address the problems that arise with extremely large database tables and corresponding database indices is to perform temporal partitioning of the index data. For example, referring to FIG. 2, there is illustrated a relational database management system 20 with a data cache 22 in memory storing an index partition 24. When the index partition 24 in the data cache 22 reaches a predetermined size, the index partition 24 is copied to secondary storage 26 and a new index partition is generated in the data cache 22. Consequently, when data are added to the database and the corresponding database index, insert operations are processed with the index partition 24 in the data cache 22 in memory, while older index partitions 28 in secondary storage 26 do not require locks for reading. This approach has one significant drawback. Although the performance of insert operations can be guaranteed because of the limited size of the index partition 24 in the data cache 22, there is no upper bound on read times. Specifically, as the database and corresponding database index grow over time, the number of index partitions 28 in secondary storage 26 increases linearly with time. When processing a read operation with the index, all of the index partitions in secondary storage 26 must be searched in order to find particular data satisfying particular data selection criteria. This means, the time needed for index read operations also increases linearly. Assuming random access to the data in the index partitions 28, virtually all page accesses will result in secondary storage access.

SUMMARY

Methods and systems for generating and utilizing a database index having a hierarchy of index partitions of exponentially increasing size at each level are disclosed. Consistent with one embodiment of the invention, a database index is generated with a first-level index partition stored in a fixed-size data cache within a memory device of a computing system. As data are generated and records are written to the database, the first-level index partition stored in the data cache also increases in size. When the first-level index partition in the data cache reaches a predetermined size, a first-level partitioning operation is performed and the first-level index partition in the data cache is written to secondary storage, and a new first-level index is generated in the data cache. As additional data are generated and more records are written to the database, the data to be indexed are written to the new first-level index partition in the data cache.

When the new first-level index partition in the data cache reaches the predetermined size, once again the index partition in the data cache is written to secondary storage and another new first-level index partition is generated in the data cache. This repeats until the number of first-level index partitions in secondary storage reaches a predetermined number. When the number of first-level index partitions in secondary storage reaches the predetermined number, a first-level merge operation is performed and the predetermined number of first-level index partitions are merged into a single second-level index partition. As part of the first-level merge operation, the first-level index partitions in secondary storage are deleted when the new second-level index partition is generated and written to secondary storage.

In this manner, a hierarchy of index partitions of exponentially increasing size are generated. For example, as additional second-level index partitions are generated by merging first-level index partitions, eventually the second-level index partitions are merged to generate a third-level index partition. Specifically, when the number of second-level index partitions reaches the predetermined number of index partitions, the second-level index partitions are merged to generate a third-level index partition. During a merge operation at any level, the plurality of lower level index partitions that are being merged are utilized to process queries until the new higher level index partition is generated and written to secondary storage. At that point, the lower level index partitions, having just been merged to form a higher level index partition, are deleted from secondary storage.

With this approach, the resulting database index is structured as a hierarchy of index partitions of exponentially increasing size at each level. This structure is particularly advantageous when utilized with applications for which large quantities of data are captured in database tables but not modified, and read infrequently if at all. For example, such applications or database tables might be referred to as write-once applications or write-once tables. Because the overall number of index partitions decreases when index partitions are merged, the performance of a database read operation is increased as a result of having fewer index partitions to search for data satisfying data selection criterion. Additionally, the size of the first-level index partition is limited, thereby preventing the performance degradation for data insertion operations that would otherwise result if the index partition was allowed to grow unbounded.

Other aspects of the invention will become apparent from the detailed description that follows.

DESCRIPTION OF THE DRAWINGS

Some embodiments are illustrated by way of example and not limitation in the figures of the accompanying drawings, in which.

DETAILED DESCRIPTION

Methods and systems for indexing extremely large volumes of data in a database using dynamically-merged index tree partitions are described. In the following description, for purposes of explanation, numerous specific details are set forth in order to provide a thorough understanding of example embodiments of the present invention. It will be evident, however, to one skilled in the art that the present invention may be practiced without these specific details.

Consistent with an embodiment of the invention, a database index is generated such that it is structured as a hierarchy of index partitions, where each index partition is structured as a B-tree and the size of each index partition increases exponentially by level in the hierarchy. Accordingly, a first-level index is smaller in size than a second-level index partition, which is smaller in size than a third-level index partition, and so on. For each database index, a single first-level index partition is maintained in a fixed-size data cache in memory, while all other index partitions are stored in secondary storage. When the first-level index partition stored in the data cache reaches a predetermined size, the index partition in the data cache is moved to secondary storage and a new first-level index partition is generated in the data cache. When the number of first-level index partitions in secondary storage reaches a predetermined number, that number of first-level index partitions is merged to generate a second-level index partition. When the number of second-level index partitions, resulting from merged first-level index partitions, reaches a predetermined number, the second-level index partitions are merged to generate a single third-level index partition. This process is repeated as necessary to generate the hierarchy of index partitions.

The levels of the hierarchy of index partitions are referred to herein as "first-level," "second-level," "third-level," and so on, to convey the relationship each level has to another within the hierarchy. One skilled in the art will appreciate that the names (e.g., "first-level") are arbitrary and not meant to limit the scope of the invention.

Because the size of the first-level index partition in the data cache has an upper limit, the performance of an insert operation can be guaranteed. Additionally, because the index partitions in secondary storage are merged to generate a hierarchy of index partitions of exponentially increasing size, as opposed to simply generating index partitions of equal size without merging any index partitions, the overall number of index partitions is decreased, thereby improving the performance of read operations performed on the index. Described below are some other algorithm optimization strategies that, when combined with this general approach, further improve the performance of reading from a write-once database table.

Figure 1:
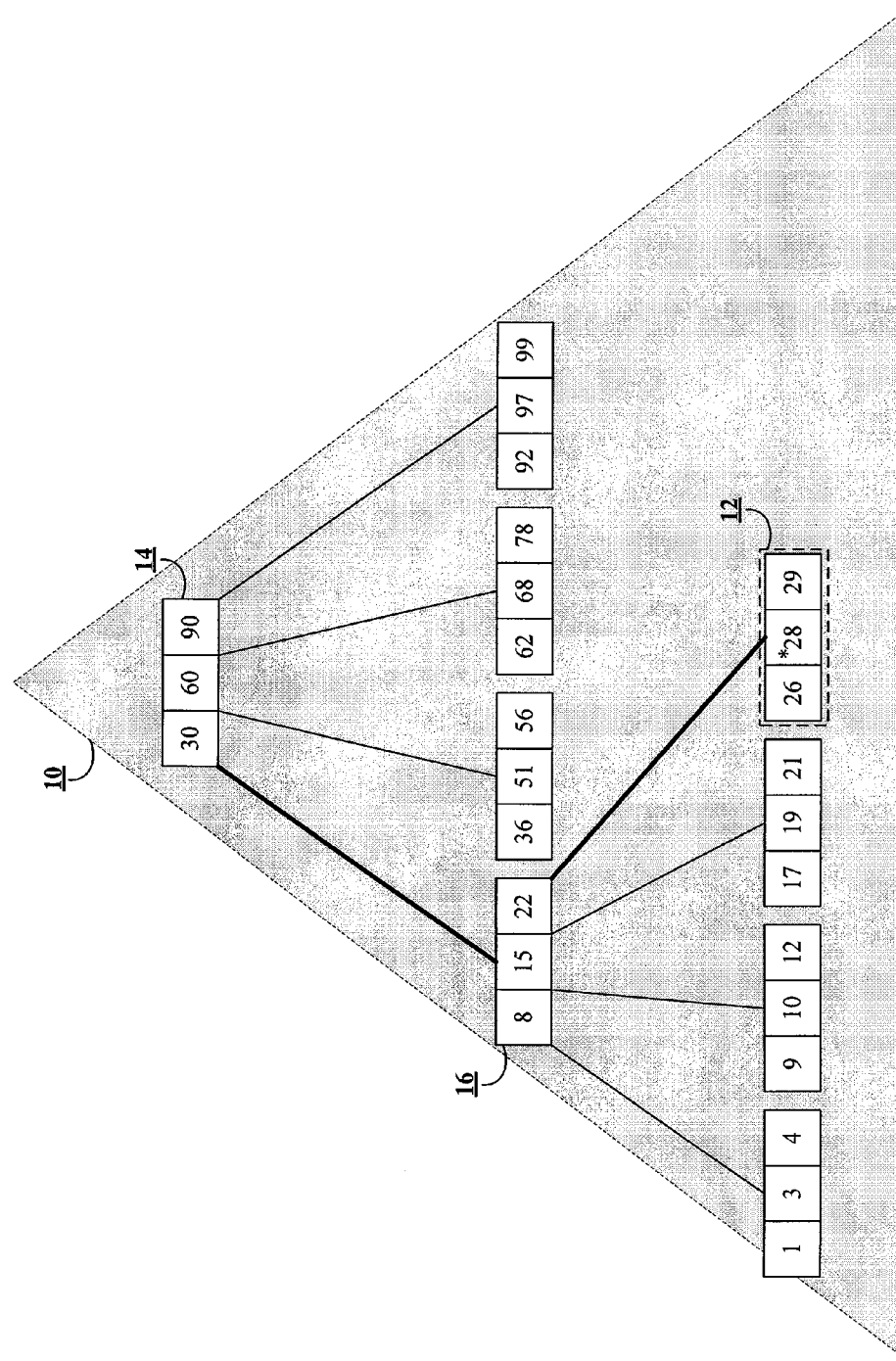
FIG. 1 is block diagram illustrating an example of a B-tree data structure with which an embodiment of the invention might be implemented.
Figure 2:
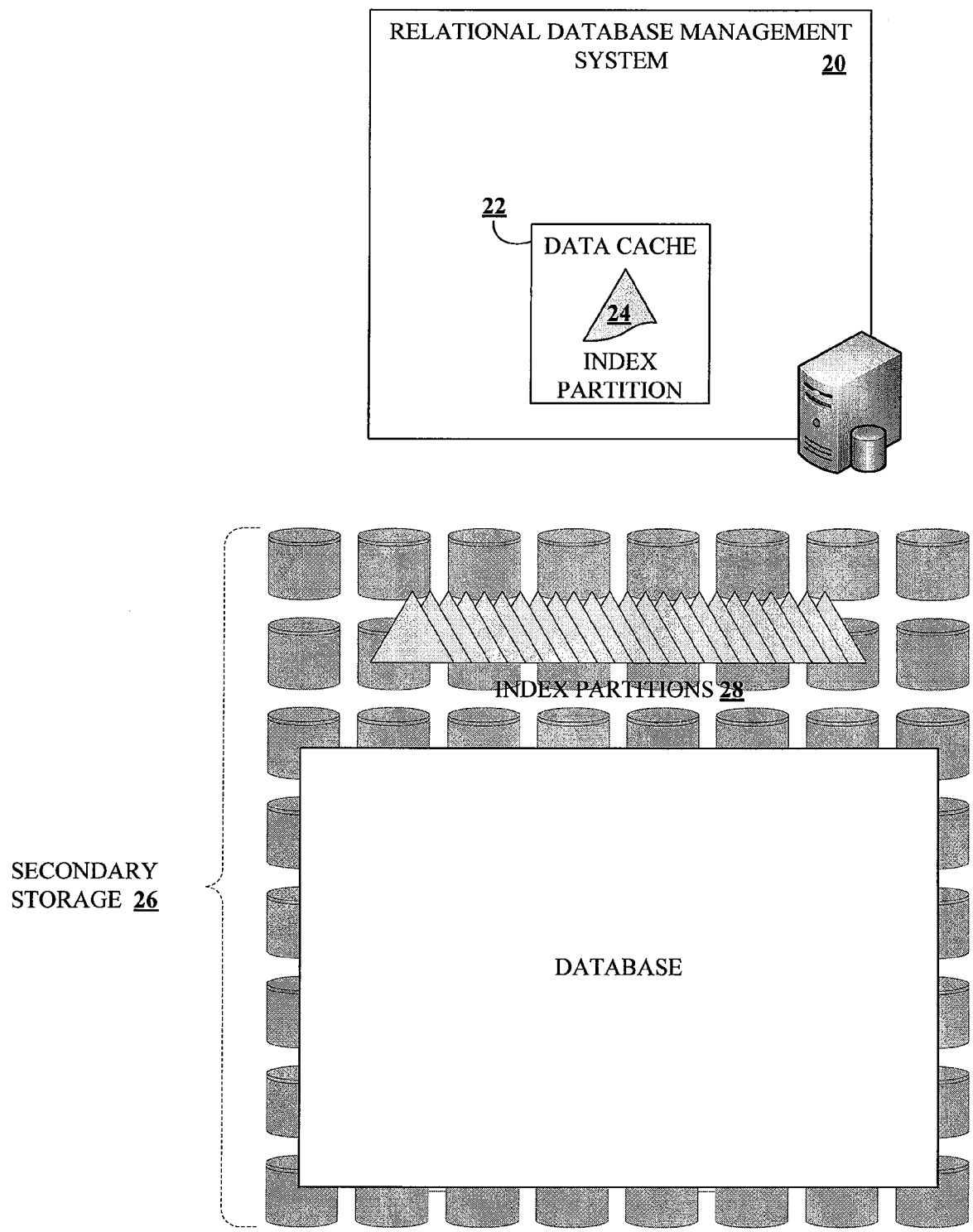
FIG. 2 is a block diagram of a conventional relational database management system with a database index having equally-sized index partitions stored in secondary storage.
Figure 3:
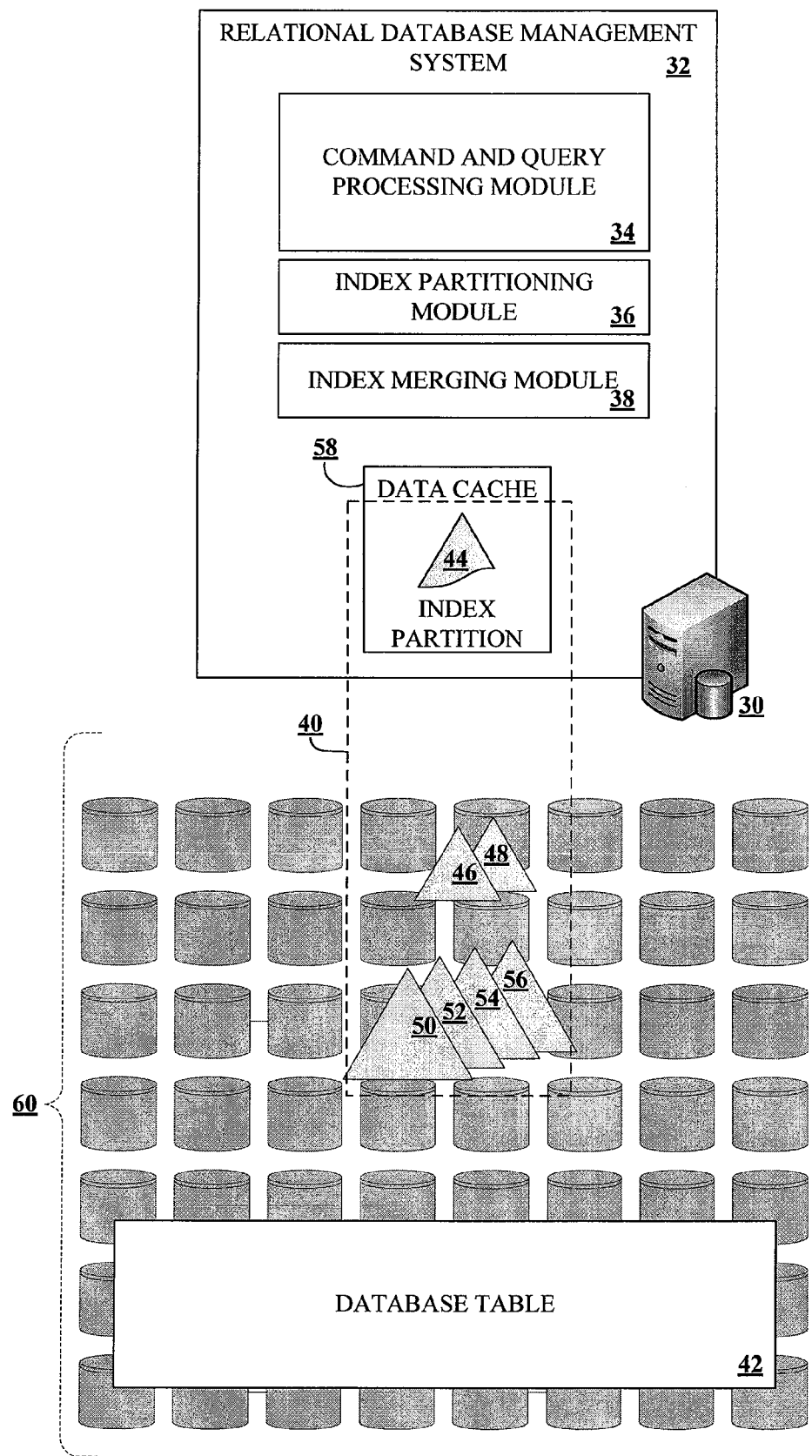
FIG. 3 is a block diagram of a relational database management system, consistent with an embodiment of the invention.

FIG. 3 is a block diagram of the functional modules of a computer system 30 configured to implement a relational database management system 32, consistent with an embodiment of the invention. The relational database management system 32 includes a command and query processing module 34, an index partitioning module 36, and an index merging module 38. In addition, the relational database management system 32 includes at least one partitioned database index 40 and at least one database table 42. The database index 40 is shown in FIG. 3 as having multiple index partitions (e.g., index partitions 44, 46, 48, 50, 52, 54, and 56). Each partition is represented as a triangle to indicate its general structure as a B-tree. As shown in FIG. 3, the index partition with reference number 44 is stored in a data cache 58 (e.g., within the memory of the computer system 30), whereas the other index partitions are all stored in secondary storage 60. The data cache 58 is simply a designated, fixed-size portion of memory for storing complete first-level index partitions for database indices and eventually portions of database tables and/or other indices and/or index partitions. When more than one database table has a corresponding database index, the data cache may have several index partitions stored completely therein—one index partition per partitioned database index. However, in general, at any given moment in time, there is only one index partition for a particular database index completely within the data cache.

Those skilled in the art of database systems will appreciate that the database management system 32 of FIG. 3 is but one example of a database management system. In various embodiments, the relational database management system may include a variety of additional functional components, which are not essential to the invention and therefore have been left out of FIG. 3 to avoid obscuring the invention in unnecessary detail. Furthermore, the database management system of FIG. 3 is shown residing and executing on a single computer system 30. In alternative embodiments, the database management system 32 may be a distributed system, residing and executing on multiple computer systems.

As its name suggests, the command and query processing module 34 of the database management system 32 processes commands and queries to perform routine database operations, such as creating and modifying database tables, creating and modifying database indices for database tables, and inserting, deleting and selecting (e.g., reading) data records. When processing a data insertion command, the command processing module 34 inserts data into the appropriate database table. If data inserted into a database table needs to be inserted or written to a database index corresponding with the database table, the data are written to the particular index partition of the database index that resides in the data cache.

The index partitioning module 36 facilitates the dynamic partitioning of first-level index partitions residing in the data cache 58. For instance, the index partitioning module 36 monitors or tracks the size of an index partition 44 for a particular database index 40 that has an index partition 44 residing in the data cache 58. When the index partition 44 residing in the data cache grows to a predetermined size, the index partition 44 is copied from the data cache to secondary storage 60, and a new index partition is generated in the data cache 58. The predetermined size at which the index partition in the data cache is copied to secondary storage is a configurable setting that will generally be dependent upon various factors, such as, system resources (e.g., memory available, speed of memory and secondary storage) and the nature of the application that is generating the data (e.g., how rapidly and frequently data events occur).

In some embodiments, the index partitioning module 36, or some other module, operates in the background to copy data from a first-level index partition stored in the data cache to a corresponding first-level index partition in secondary storage. For instance, as data are added to a first-level index partition stored in the data cache, the first-level index partition grows in size. As this is occurring, a background process copies data from the first-level index partition in the data cache to a corresponding first-level index partition in secondary storage. For example, in some embodiments, as data are written to the first-level index partition in the data cache, the data are simultaneously, or substantially simultaneously, mirrored (e.g., written) to a corresponding index partition in secondary storage. Accordingly, when the first-level index partition residing in the data cache reaches the predetermined size, it will not be necessary to copy the entire index partition to secondary storage because a copy of the index partition, or at least a significant portion of the index partition, will already reside in secondary storage. In such a scenario, as soon as the complete first-level index partition is written to secondary storage, the first-level index partition in the data cache can be deleted and a new index partition can be generated in the data cache.

The index merging module 38 monitors and tracks the index partitions residing in secondary storage 60. In particular, the index merging module 38 determines when the number of index partitions at a given level in the hierarchy of index partitions reaches a predetermined number. When the number of index partitions at a particular level in the hierarchy reaches a predetermined number, the index merging module 38 performs a merge operation to merge the predetermined number of index partitions into a single index partition of a higher level. For example, in a scenario where the predetermined number is four, when the index merging module 38 determines that four first-level index partitions have been written to secondary storage, the index merging module performs a first-level index merge operation to merges the four first-level index partitions to generate a single second-level index partition. The predetermined number is a configurable setting and is generally dependent upon the application generating the data and the resources of the computer system 30, such as the size of the data cache and performance characteristics of the input/output system. In some embodiments, during a merge operation, the data are sorted and balanced so that a resulting index partition is a sorted and balanced index that is optimized for searching.

Figure 4:
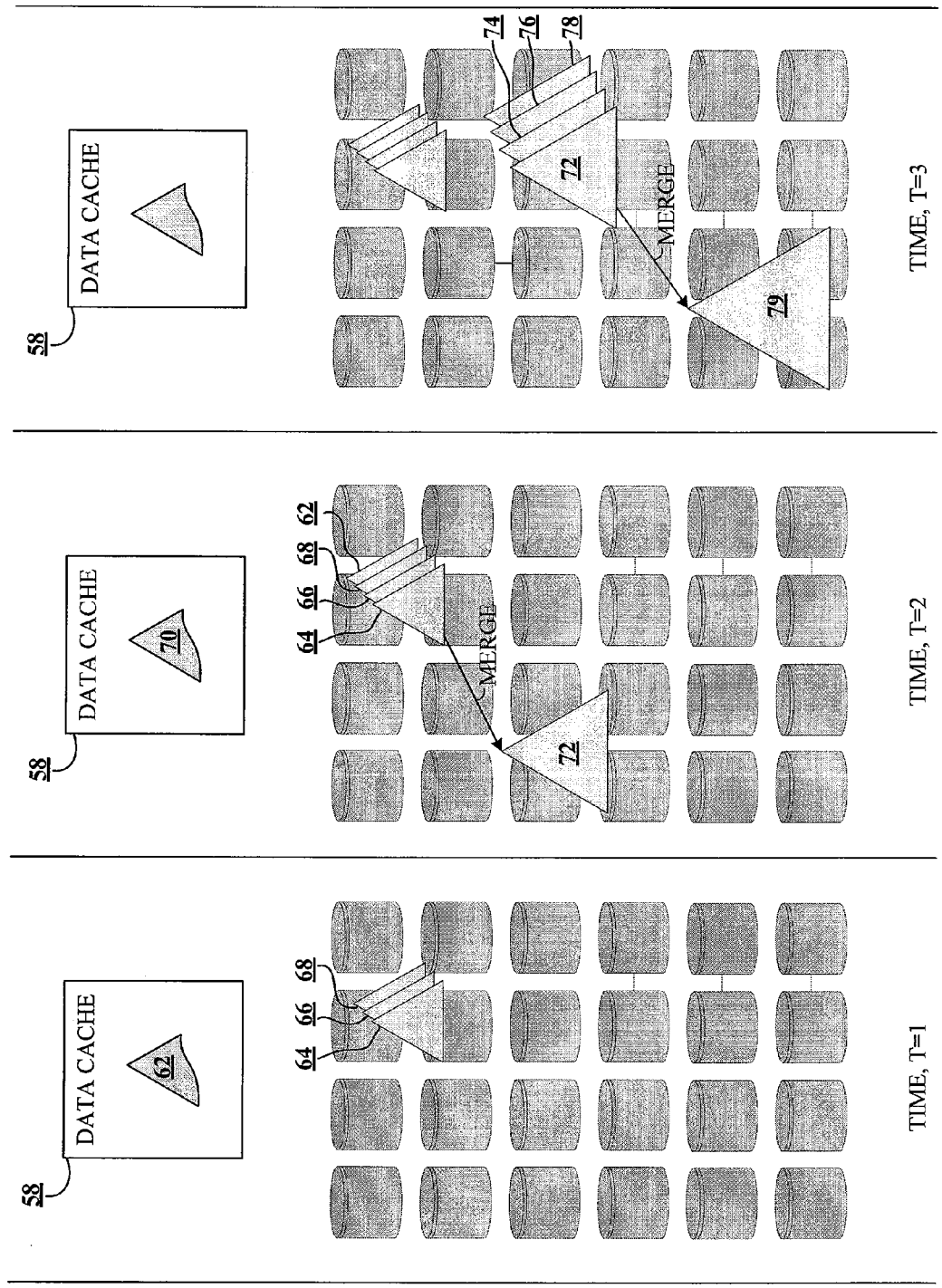
FIG. 4 is a block diagram illustrating, at three different points in time, a database index partitioned into a hierarchy of index partitions of exponentially increasing size, consistent with an embodiment of the invention.

FIG. 4 is a block diagram illustrating, at three different points in time, a database index partitioned into a hierarchy of index partitions of exponentially increasing size, consistent with an embodiment of the invention. As illustrated in FIG. 4, at a first point in time (e.g., Time, T=1), the database index is comprised of four separate index partitions. In this case, the four index partitions are all first-level index partitions 62, 64, 66 and 68. As first-level index partitions, the three index partitions in secondary storage are all of an equivalent size. As data are generated and written to a database table, the data to be included in the database index are written to the index partition 62 residing in the data cache 58. When the index partition 62 residing in the data cache 58 reaches a predetermined size, a first-level index partition operation is performed and the index partition in the data cache 58 is copied to secondary storage, and a new index partition is generated in the data cache 58. The predetermined size at which the index partition is copied to secondary storage is a configurable option that is dependent upon the application generating the data, and such aspects of the hardware as the total size of available memory. For instance, in some embodiments, the predetermined size may be established as fifty percent of the size of the data cache 58. However, if the data cache is to store several index partitions—one for each database index—then the predetermined size at which the index partition is to be copied to secondary storage will typically be set to a size considerably smaller than fifty percent of the size of the data cache.

As data are continuously generated and added to the database table and corresponding database index, the size and number of index partitions continues to grow. As illustrated in FIG. 4, at time T=2 the database index is shown during a first-level index merge operation. This occurs, for example, after the index partition 62, which was previously stored in the data cache 58 at time T=1, has been copied to secondary storage. Accordingly, there are now four first-level index partitions 62, 64, 66 and 68 in secondary storage and one newly generated first-level index partition 70 in the data cache 58.

Assuming that the index merging module 38 (in FIG. 3) is configured to perform a merge operation when the number of index partitions at any level reaches four, the first-level index merge operation is initiated when the index partition 62 previously stored in the data cache is completely written to secondary storage. During the first-level index merge operation, the four first-level index partitions (e.g., 62, 64, 66 and 68) are read from secondary storage, sorted, and written back to secondary storage. The index merge operation executes in linear time and for all practical purposes in constant memory. Accordingly, the index merge operation typically does not affect the data cache utilization. In some embodiments, the merge algorithm simply reads pages linearly from all source index partitions (e.g., 62, 64, 66 and 68) and writes to the new index partition (e.g., 72) also linearly, thus incurring only constant overhead on the I/O system (amortized) per level.

If the number of index partitions to be merged is set to k, then there are no more than k+1 partitions in each level existing at the same time—k of which are being merged into the next level and 1 being merged from the previous level. If the total number of levels in the hierarchy is n, the total number of index partitions in a particular database index can be calculated as:

$$f_{dyn}(n,k)=n(k+1)$$

If a merge operation is slow, the possibility exists that more than k+1 index partitions could be generated for a single level in the hierarchy. By sizing the index partitions appropriately to suit the particular application and system resources, this situation can be prevented.

Referring again to FIG. 4, at time T=3, the database system is shown while a second-level index merge operation is being performed. For instance, at time T=3, four second-level index partitions (e.g., 72, 74, 76 and 78) are being merged to form a single third-level index partition 79. Accordingly, as additional data are inserted into the database and corresponding database index, the number of index partitions and the number of levels in the hierarchy of index partitions continues to grow as index partitions are dynamically merged over time.

Figure 5:
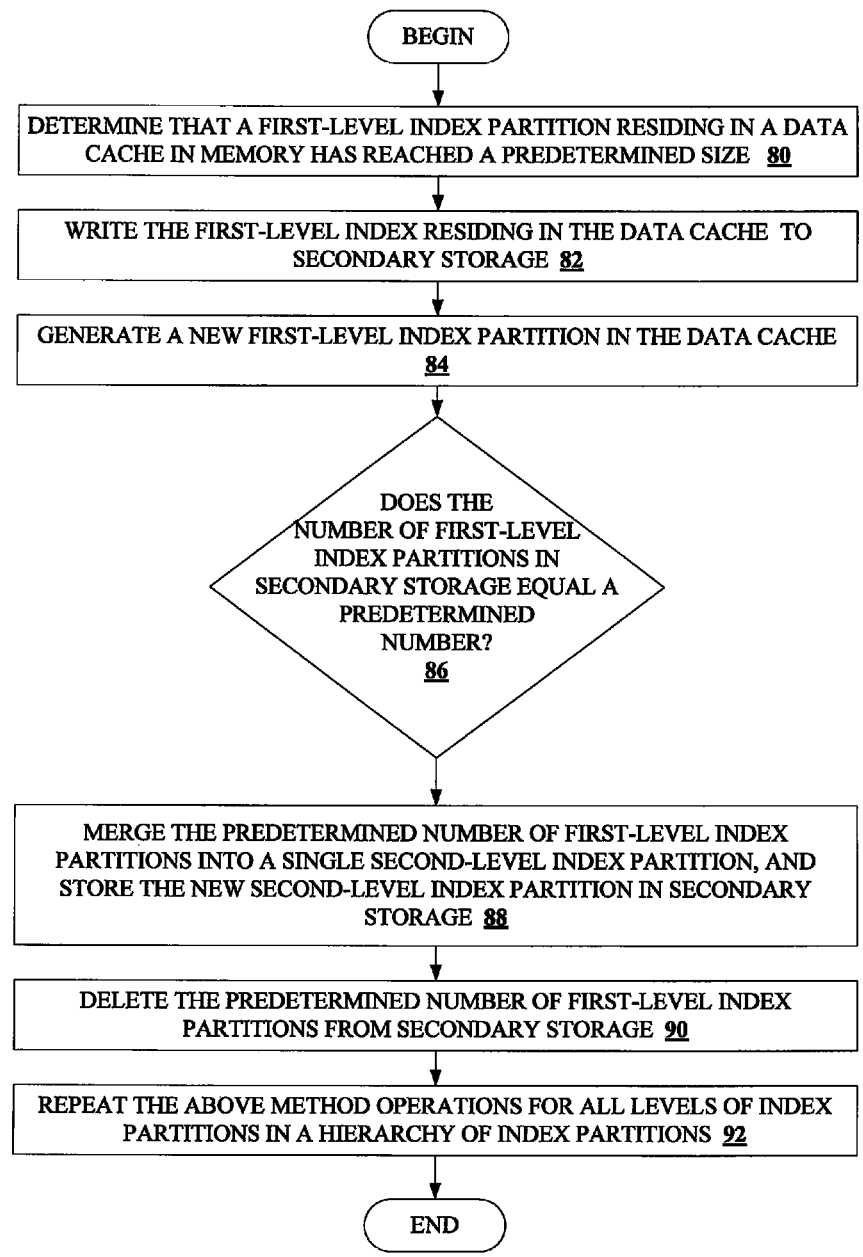
FIG. 5 is a flow diagram illustrating the method operations for a method of partitioning a database index, according to an embodiment of the invention.

FIG. 5 is a flow diagram illustrating the method operations for a method of partitioning a database index, according to an embodiment of the invention. The method begins at operation 80 when it is determined that a first level index partition residing in the data cache (e.g., in memory) has reached a predetermined size. For instance, in some embodiments, the index partitioning module 36 makes a determination that the index partition residing in the data cache has reached a predetermined size. The predetermined size, for example, may be a configurable setting and may be set to fifty percent of the fixed-size of the data cache, or some other appropriate size given the available system resources and characteristics of the application that generates the data.

At method operation 82, the first-level index partition residing in the data cache is written to secondary storage. For instance, the index partitioning module 36 may perform a first-level index partitioning operation, during which the first-level index partition residing in the data cache is written to secondary storage. Next, at method operation 84, a new first level index partition is generated in the data cache. For instance, as part of the first-level index partitioning operation, the index partitioning module 36 may generate a new first-level index partition in the data cache.

At method operation 86, a determination is made as to whether the number of first-level index partitions in secondary storage is equal to a predetermined number. For example, assuming for purposes of this example that the predetermined number is four, the index merging module 38 will determine whether or not there are four first-level index partitions in secondary storage. If so, at method operation 88, the four first-level index partitions are merged into a single second-level index partition, and the new second-level index partition is written to and stored in secondary storage. At method operation 90, upon completion of writing the new second-level index partition to secondary storage, a predetermined number (e.g., four) of first-level index partitions are deleted from secondary storage. During the merge operation, the lower level index partitions (e.g., the first level index partitions) are utilized to process data selection operations. However, upon completing the operation to merge the first-level index partitions and create a second-level index partition, the new second-level index partition is utilized to process data selection operations.

In general and as indicated by method operation 92, the method operations described above are repeated continuously as data are generated and processed by the database system. Although the method operations illustrated in FIG. 5 are shown to occur in a particular order, it will be appreciated by those skilled in the art that the index partitioning operations and the index merging operations may occur concurrently, and may occur simultaneously at multiple levels in the hierarchy. For instance, a merge operation may occur to merge multiple first-level index partitions into a single second level index partition while at the same time a second merge operation is occurring to merge multiple second-level index partitions into a single third-level index partition. While the merge operations are occurring, the index partitioning module may be simultaneously generating a new first-level index partition in the data cache while copying a first-level index partition to secondary storage. Furthermore, data selection (e.g., read) operations may be processed during an index partitioning operation or an index merging operation.

Figure 6:
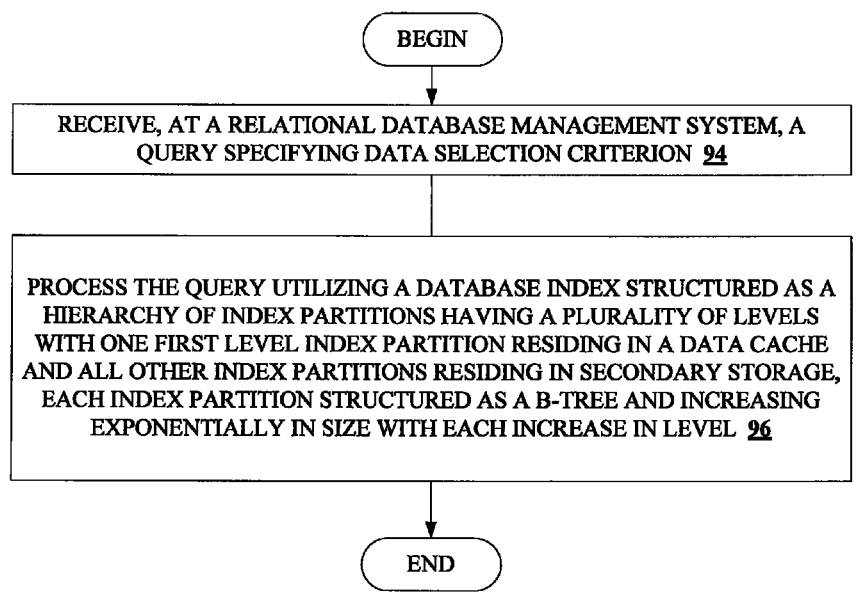
FIG. 6 is a flowchart diagram illustrating a method for processing queries with a database index structured as a hierarchy of index partitions of exponentially increasing size, consistent with an embodiment of the invention.

FIG. 6 is a flowchart diagram illustrating a method for processing queries with a database index partitioned into a hierarchy of index partitions of exponentially increasing size, consistent with an embodiment of the invention. At method operation 94, the relational database management system receives a query specifying some data selection criterion. Assuming the data in the database table have been indexed in accordance with the data selection criterion, at method operation 96, the relational database management system processes the query utilizing a database index that has been structured as a hierarchy of index partitions consistent with an embodiment of the invention. For example, the index will have several levels of index partitions with one first level index partition residing in a data cache and all the other index partitions residing in secondary storage. Each index partitions is structured as a B-tree, and the index partitions at each level increase exponentially in size, such that a third-level index partition is greater in size than a second-level index partition, which, in turn, is greater in size than a first level index partition.

Because the index is partitioned over time, each index partition stores data that is relevant to a particular period of time. Accordingly, in some embodiments, selection operations may be further optimized by searching only those index partitions that include data generated in a specific time period. For instance, if a query specifies a time or time period, the query processing module can determine those index partitions that include data corresponding with or satisfying the time or time period specified in the query. Accordingly, each index partition may be associated with a lower time boundary and an upper time boundary, where the time boundaries together specify a time range.

In some embodiments, the maximum and minimum data values entered into the index may be used to identify the index partitions to be searched when processing a query. For example, in some scenarios the data values entered into the index may have some correlation to time. For example, if the data being processed includes serial numbers—such that, over time, the serial numbers increase—the minimum and maximum serial numbers in any given index partition can be used to determine whether a given index partition should be searched during the processing of a particular query. Accordingly, each index partition might have a minimum and maximum value boundary specifying a value range for the values stored within the particular index partition. If, for example, a query specifies as selection criterion a value that falls within the minimum and maximum range for a particular index partition, then that particular index partition should be searched during the processing of the query.

In some embodiments, the structure of the B-tree index might be different from conventional B-tree indices. For instance, because an index partition written to secondary storage is only used to process data selection operations and not data insertion operations, the data indices in secondary storage need not be rebalanced. Consequently, in some embodiments, data used for rebalancing an index partition can be left out without impacting performance. Other examples of optimizations that might be used in combination with the methodologies described herein include:

More compact index pages, since no space is wasted by page split operations.

Data compression using prefix compression—a significant space savings can be achieved due to relatively large index key prefix size in comparison to regular index trees.

Data compression—due to relatively high redundancy of data within an index partition, data compression can achieve considerable savings.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 7:
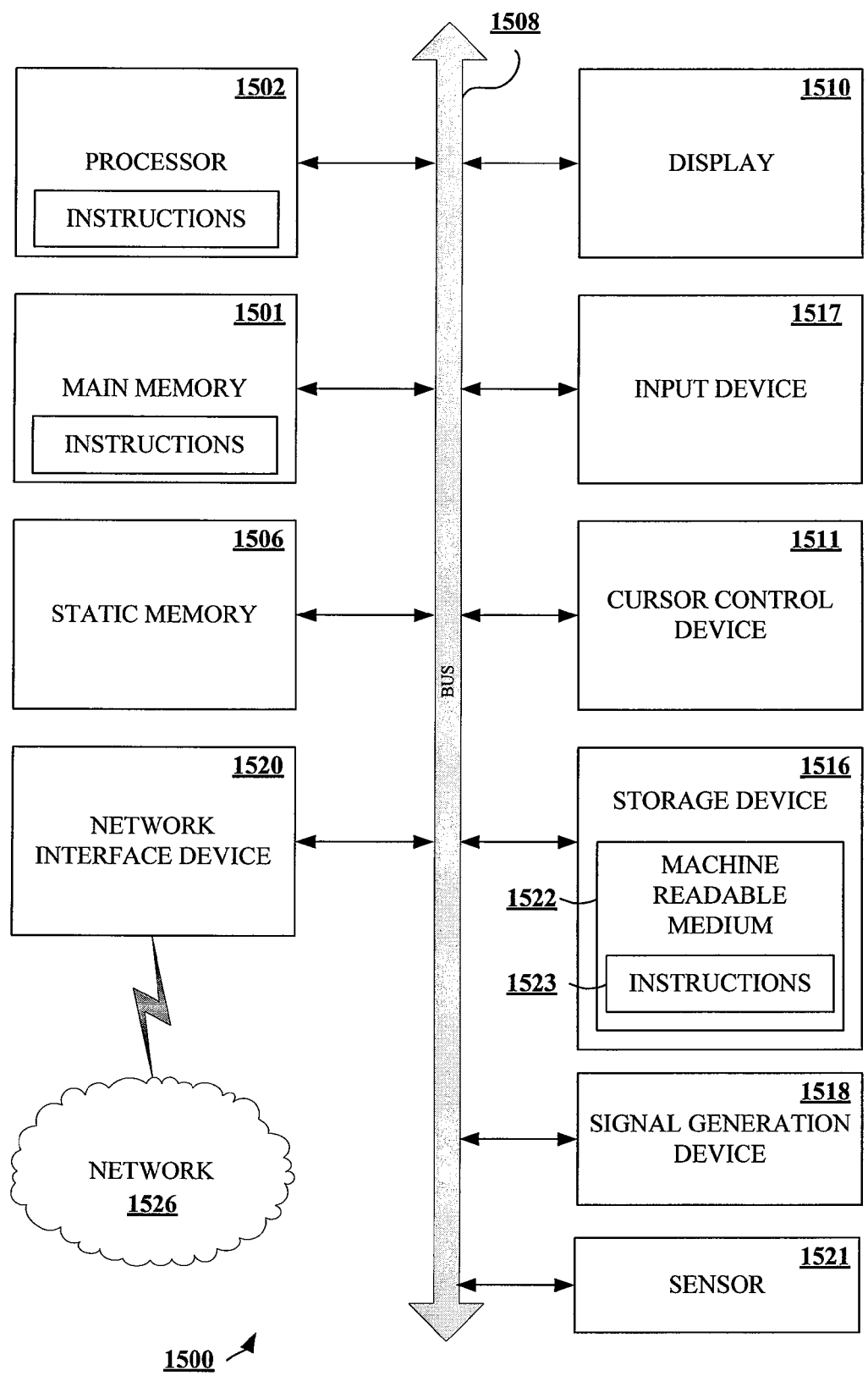
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A processor-implemented method for processing a query using a database index, the method comprising:

partitioning a database index by determining that a first-level index partition stored in a data cache exceeds a threshold size, the database index structured as a hierarchy of index partitions having a plurality of levels with one index partition at a first-level residing in a data cache and all other index partitions residing in secondary storage, each index partition structured as a B-tree increasing exponentially in size with each increase in level within the hierarchy;

after determining that a first-level index partition stored in a data cache exceeds a threshold size, performing a first-level partitioning operation to write the first-level index partition stored in the data cache to a secondary storage, and generate a new first-level index partition in the data cache;

performing a first-level merge operation, after determining that a number of first-level index partitions in the secondary storage has reached a predetermined number, the first-level merge operation merges the predetermined number of first-level index partitions into a single second-level index partition, and deletes the predetermined number of first-level index partitions from the secondary storage;

receiving, at a processor-implemented query processing module, a query specifying data selection criterion; and utilizing the database index to process the query and to provide, from a database table, records satisfying the data selection criterion.

2. The processor-implemented method of claim 1, wherein the utilizing the database index to process the query and provide records satisfying the data selection criterion comprises causing the records to be communicated to, and displayed at, a computer system from which the query was received.

3. The processor-implemented method of claim 1, wherein the query specifies a first time range, the method further comprising:

determining which index partitions in the hierarchy of index partitions to search for data satisfying the selection criterion by analyzing lower and upper time boundaries for the index partitions, the lower and upper time boundaries for a particular index partition specifying a second time range representing a period of time during which records were written to the particular index partition.

4. The processor-implemented method of claim 1, wherein the query specifies a first value range, the method further comprising:

determining which index partitions in the hierarchy of index partitions to search for data satisfying the selection criterion by analyzing lower and upper value boundaries for the index partitions, the lower and upper value boundaries for a particular index partition specifying a second value range representing range of values in records that were written to the particular index partition.

5. The processor-implemented method of claim 1, wherein index partitions at levels above the first level do not include data used for B-tree balancing.

6. A system comprising:

an index partitioning module, implemented by at least one processor of a database management system, configured to partition a database index by:

determining that a first-level index partition stored in a data cache exceeds a threshold size, the database index structured as a hierarchy of index partitions having a plurality of levels with one index partition at a first-level residing in a data cache and all other index partitions residing in secondary storage, each index partition structured as a B-tree increasing exponentially in size with each increase in level within the hierarchy; and after determining that a first-level index partition stored in a data cache exceeds a threshold size, performing a first-level partitioning operation to write the first-level index partition stored in the data cache to a secondary storage, and generate a new first-level index partition in the data cache;

an index merging module configured to perform a first-level merge operation, after determining that a number of first-level index partitions in the secondary storage has reached a predetermined number, the first-level merge operation merges the predetermined number of first-level index partitions into a single second-level index partition, and deletes the predetermined number of first-level index partitions from the secondary storage; and a query processing module, implemented by at least one processor of the database management system, configured to receive a query specifying data selection criterion and, utilizing the database index to process the query and to provide, from a database table, records satisfying the data selection criterion.

7. The system of claim 6, wherein the utilizing the database index to process the query and provide records satisfying the data selection criterion comprises causing the records to be communicated to, and displayed at, a computer system from which the query was received.

8. The system of claim 6, wherein the query specifies a first time range and the query processing module is configured to determine which index partitions in the hierarchy of index partitions to search for data satisfying the selection criterion by analyzing lower and upper time boundaries for the index partitions, the lower and upper time boundaries for a particular index partition specifying a second time range representing a period of time during which records were written to the particular index partition.

9. The system of claim 6, wherein the query specifies a first value range, and the query processing module is configured to determine which index partitions in the hierarchy of index partitions to search for data satisfying the selection criterion by analyzing lower and upper value boundaries for the index partitions, the lower and upper value boundaries for a particular index partition specifying a second value range representing range of values in records that were written to the particular index partition.

10. The system of claim 6, wherein index partitions at levels above the first level do not include data used for B-tree balancing.

11. A non-transitory machine readable storage medium that stores instructions which when performed by a machine, cause the machine to execute a network-based application, which causes the machine to perform operations comprising:

partitioning a database index by determining that a first-level index partition stored in a data cache exceeds a threshold size, the database index structured as a hierarchy of index partitions having a plurality of levels with one index partition at a first-level residing in a data cache and all other index partitions residing in secondary storage, each index partition structured as a B-tree increasing exponentially in size with each increase in level within the hierarchy;

after determining that a first-level index partition stored in a data cache exceeds a threshold size, performing a first-level partitioning operation to write the first-level index partition stored in the data cache to a secondary storage, and generate a new first-level index partition in the data cache;

performing a first-level merge operation, after determining that a number of first-level index partitions in the secondary storage has reached a predetermined number, the first-level merge operation merges the predetermined number of first-level index partitions into a single second-level index partition, and deletes the predetermined number of first-level index partitions from the secondary storage;

receiving, at a processor-implemented query processing module, a query specifying data selection criterion; and utilizing the database index to process the query and to provide, from a database table, records satisfying the data selection criterion.

12. The non-transitory machine-readable storage medium of claim 11, wherein the utilizing the database index to process the query and provide records satisfying the data selection criterion comprises causing the records to be communicated to, and displayed at, a computer system from which the query was received.

13. The non-transitory machine-readable storage medium of claim 11, wherein the query specifies a first time range, the operations further comprising:

determining which index partitions in the hierarchy of index partitions to search for data satisfying the selection criterion by analyzing lower and upper time boundaries for the index partitions, the lower and upper time boundaries for a particular index partition specifying a second time range representing a period of time during which records were written to the particular index partition.

14. The non-transitory machine-readable storage medium of claim 11, wherein the query specifies a first value range, the operations further comprising:

determining which index partitions in the hierarchy of index partitions to search for data satisfying the selection criterion by analyzing lower and upper value boundaries for the index partitions, the lower and upper value boundaries for a particular index partition specifying a second value range representing range of values in records that were written to the particular index partition.

15. The non-transitory machine-readable storage medium of claim 11, wherein index partitions at levels above the first level do not include data used for B-tree balancing.

* * * * *